(12) United States Patent
Curlier et al.

(10) Patent No.: US 10,006,539 B2
(45) Date of Patent: Jun. 26, 2018

(54) EPICYCLIC REDUCTION GEAR WITH FLUID TRANSFER PIPES, AND PROPELLER TURBOMACHINE FOR AN AIRCRAFT WITH SUCH A REDUCTION GEAR

(71) Applicant: SNECMA, Paris (FR)

(72) Inventors: Augustin Curlier, Moissy-Cramayel (FR); Tewfik Boudebiza, Moissy-Cramayel (FR); Gilles Alain Charier, Moissy-Cramayel (FR)

(73) Assignee: SNECMA, Paris (FR)

( * ) Notice: Subject to any disclaimer, the term of this patent is extended or adjusted under 35 U.S.C. 154(b) by 339 days.

(21) Appl. No.: 14/907,791

(22) PCT Filed: Aug. 6, 2014

(86) PCT No.: PCT/FR2014/052051
§ 371 (c)(1),
(2) Date: Jan. 26, 2016

(87) PCT Pub. No.: WO2015/019025
PCT Pub. Date: Feb. 12, 2015

(65) Prior Publication Data
US 2016/0201791 A1    Jul. 14, 2016

(30) Foreign Application Priority Data

Aug. 8, 2013 (FR) ..................... 13 57907

(51) Int. Cl.
*F02C 7/06* (2006.01)
*F16H 57/04* (2010.01)
(Continued)

(52) U.S. Cl.
CPC ........... *F16H 57/0486* (2013.01); *F02C 7/36* (2013.01); *F16H 1/28* (2013.01); *F16H 57/043* (2013.01);
(Continued)

(58) Field of Classification Search
CPC ............ F02C 7/36; F05D 2260/40311; F05D 2260/98; F16H 1/28; F16H 57/0427;
(Continued)

(56) References Cited

U.S. PATENT DOCUMENTS 5,107,676 A * 4/1992 Hadaway ................ F01D 25/18
184/6.11
5,720,216 A    2/1998 Haka
(Continued)

FOREIGN PATENT DOCUMENTS

WO    2010/092263 A1    8/2010

OTHER PUBLICATIONS

International Search Report dated Jan. 20, 2015, issued in corresponding International Application No. PCT/FR2014/052051, filed Aug. 6, 2014, 2 pages.
(Continued)

*Primary Examiner* — Jesse Bogue
(74) *Attorney, Agent, or Firm* — Christensen O'Connor Johnson Kindness PLLC

(57) ABSTRACT

The epicyclic reduction gear comprises a planetary input shaft, planet gears meshing around said shaft and supported by a planet carrier, and two transverse sides. According to the invention, the reduction gear comprises at least one fluid transfer pipe suitable for being connected to a fluid supply source and passing through the planet carrier, being linked in rotation to same, from a first of said transverse sides of the reduction gear to a second of said transverse sides of the latter in order to open on the outside of the reduction gear and dispense the fluid.

11 Claims, 5 Drawing Sheets

(51) Int. Cl.
    *F16H 1/28*     (2006.01)
    *F16H 57/08*     (2006.01)
    *F02C 7/36*     (2006.01)

(52) U.S. Cl.
    CPC ..... *F16H 57/0427* (2013.01); *F16H 57/0471* (2013.01); *F16H 57/0482* (2013.01); *F16H 57/082* (2013.01); *F05D 2260/40311* (2013.01); *F05D 2260/98* (2013.01)

(58) Field of Classification Search
    CPC ............... F16H 57/043; F16H 57/0471; F16H 57/0482; F16H 57/0486; F16H 57/082
    See application file for complete search history.

(56) References Cited

U.S. PATENT DOCUMENTS

| | | | | |
|---|---|---|---|---|
| 8,820,478 B2* | 9/2014 | Gauthier | ................. | F02C 3/107 |
| | | | | 184/6.12 |
| 9,677,659 B1* | 6/2017 | Niergarth | ................. | F02C 7/36 |
| 2009/0247348 A1 | 10/2009 | Haupt | | |
| 2010/0160104 A1* | 6/2010 | Dinter | ................. | F16H 57/0427 |
| | | | | 475/159 |
| 2010/0317478 A1 | 12/2010 | McCune | | |
| 2011/0305575 A1* | 12/2011 | Balk | ........................ | B63H 3/06 |
| | | | | 416/170 R |
| 2013/0225353 A1* | 8/2013 | Gallet | ................. | F16H 57/0423 |
| | | | | 475/159 |
| 2015/0139802 A1* | 5/2015 | Curlier | ................. | B64C 11/306 |
| | | | | 416/147 |

OTHER PUBLICATIONS

Written Opinion of the International Searching Authority, issued in corresponding International Application No. PCT/FR2014/052051, filed Aug. 6, 2014, 5 pages.

Written Opinion of the International Searching Authority dated Jan. 20, 2015, issued in corresponding International Application No. PCT/FR2014/052051, filed Aug. 6, 2014, 6 pages.

International Preliminary Report on Patentability dated Feb. 9, 2016, issued in corresponding International Application No. PCT/FR2014/052051, filed Aug. 6, 2014, 1 page.

* cited by examiner

EPICYCLIC REDUCTION GEAR WITH FLUID TRANSFER PIPES, AND PROPELLER TURBOMACHINE FOR AN AIRCRAFT WITH SUCH A REDUCTION GEAR

The present invention relates to the field of epicyclic reduction gears and more particularly, though not exclusively, the application of such an epicyclic reduction gear to a turbine engine having a pair of contra-rotating propulsion propellers.

Turbine engines having propulsion propellers are, in the preferential application, turboshaft engines designated by the expression "open rotor" or "unducted fan" and which are in particular the subject of numerous developments because of their lower consumption of fuel compared with the multiflow turbojet engines in service on commercial aircraft. The architecture of the propulsion systems of the open rotor type are distinguished from that of turbojet engines by the fact that the fan is no longer internal but external and is composed of two coaxial contra-rotating propellers that may be situated upstream or downstream of the gas generator.

A turboshaft engine 1 having a pair of contra-rotating upstream 2 and downstream 3 propellers is depicted schematically in FIG. 1 and comprises mainly, on a central longitudinal axis A, two separate parts. A "gas generator" part G is situated inside a stationary cylindrical nacelle 4 having a structural casing 5, carried by the structure of the aircraft (such as the rear part of the fuselage of an aeroplane), and a "propulsion" part P having a pair of contra-rotating propellers 2, 3 constituting the open-rotor fan. This part P extends, in this example of a turboshaft engine, the gas generator part G and the nacelle 4.

The gas generator part G of the turboshaft engine 1 usually comprises, from upstream to downstream in the direction of flow, with respect to the axis A, of the gaseous flow F entering the nacelle 4 of the turboshaft engine, one or two compressors 7 depending on the architecture of the single- or dual-body gas generator, an annular combustion chamber 8, one or more turbines 9 having different pressures depending on said architecture, one of which 9A drives, by means of a reduction gear 10 having epicyclic trains (PGB, standing for power gear box) and in a contra-rotating fashion, the concentric coaxial shafts 11 and 12 of the two upstream 2 and downstream 3 propellers, aligned on the axis A of the turboshaft engine. An exhaust nozzle 13 terminates the turboshaft engine 1 in the usual fashion.

Concerning the propulsion part P, the two contra-rotating propellers, respectively upstream (front) 2 and downstream (rear) 3, are disposed in radial parallel planes, perpendicular to the axis A, and comprise rotating casings having polygonal annuluses 14, 15 extending the nacelle and in which radial cylindrical compartments 16, 17 are provided, evenly distributed for receiving the roots or pivots 18, 19 of the blades 20, 21 of the propellers.

The casings having annuluses 14, 15 are respectively connected to the drive shafts 11, 12 turning in opposite directions of rotation by means of the turbine and reduction gear 10, the latter imposing the opposite directions of rotation on the two propellers. In order to guarantee the positioning of the shafts of the upstream propeller and of the downstream propeller with respect to each other, several bearings are provided, one of which 22 is situated between the two shafts 11 and 12 of the upstream and downstream propellers, the shaft 12 of the downstream propeller 3 being radially internal with respect to the shaft 11 of the upstream propeller 2 then radially external.

Because of the dynamic stresses encountered during the functioning of the turboshaft engine, suitable lubrication, which is the subject matter of the present invention, is provided for this bearing, as moreover for all the other bearings, not shown, present in the turboshaft engine.

Before coming to the lubrication of this bearing that is the subject matter of the invention, in operation and briefly, the air flow F entering the turboshaft engine 1 is compressed, and then mixed with fuel and burnt in the combustion chamber 8. The combustion gases generated next pass through the part having turbines 9 and 9A in order to drive, in opposite rotation, via the epicyclic reduction gear 10, the propellers 2, 3 that supply the major part of the thrust. The combustion gases are expelled through the exhaust nozzle 13, thus increasing the thrust of the turboshaft engine 1.

Moreover, to allow optimum functioning of the turboshaft engine 1 according to the different flight phases encountered, a suitable control system 25 makes it possible to vary the pitch of the blades during flight, that is to say the pitch of the contra-rotating propellers. For this purpose, the pivots 18, 19 of the radial blades are rotated by the system 25 in order to turn, with respect to their axes B substantially perpendicular to the longitudinal axis A, in the radial compartments 16, 17. For example, according to the system, the blades may turn through +90° to 30° for the flight phases, around +30° to −15° for the phases on the ground and thrust reversal, and have a rapid return to 90°, in the flag position, in the event of malfunctioning in flight (engine failure), in which the blades are retracted with respect to the direction of travel of the aeroplane and offer the least drag possible.

The system 25 for controlling the blades of the downstream propeller 3 is shown schematically by a rectangle in FIG. 1 and generally comprises a fluid linear actuator 26 to which a connection mechanism 27 is connected that connects the movable part of the actuator to the pivots 19 of the blades 21 in order to convert the translation movement of the actuator into a rotation of the blades of the downstream propeller about the axes B. A system for controlling the pitch of the blades, not shown, is also provided for the upstream propeller.

The lines 28 comprise lubrication-supply lines as well as high-pressure oil lines, which are three in number for the aforementioned specific operating phases of the pitch-control system 25, and run inside a cylindrical sleeve 29 housed, along the axis A, in the internal shaft 12 and mechanically connected upstream to the exhaust casing 30 of the gas generator G and downstream to the control system 25 leading to the actuator 26.

The lines 28 supplying lubricant and high-pressure oil are respectively supplied from a source of lubricant and high-pressure oil, not shown, situated in the structural casing 5, on the nacelle side, and pass through radial arms in order to end up in the gas generator part G.

In addition to these lines 28 of the control system 25, lubrication lines for the inter-shaft bearing 22 and for other bearings, not shown, in particular the one situated between the sleeve and the internal shaft of the downstream propeller, as well as electrical equipment lines for the functioning of the control system, pass through the sleeve 29.

The lubrication of the inter-shaft bearing 22 is shown in FIG. 2, where it can be seen that the corresponding line 31 running in the sleeve 29 terminates in at least one nozzle 32 radially secured to the lateral wall of the sleeve. The oil circulating in the line 31 and emerging from the nozzle 32 passes through the annular space between the sleeve 29 and the downstream-propeller shaft 12, and then reaches the inter-shaft bearing 22 to be lubricated through orifices 33 provided in the lateral wall of the shaft 12 of the downstream propeller.

The multitude of hydraulic and electrical lines passing inside this sleeve 29 is therefore apparent, which involves designing a sleeve to have a corresponding diameter in order to house all the lines therein. In the application of the invention, the outside diameter of the sleeve is dependent on the inside diameter of the planetary shaft of the reduction gear 10 corresponding to that of the input shaft 35 of the power turbine that rotates the reduction gear 10. The sleeve therefore occupies a large amount of space at the heart of the turboshaft engine 1, which is detrimental to the very integration of the reduction gear.

Thus, in order to facilitate such integration, the applicant wondered whether it was possible to move at least one of the bearing lubrication lines passing through the sleeve, in this case the line lubricating the inter-shaft bearing 22 (the lines for the system for controlling the pitch of the blades of the downstream propeller not being movable since they have to supply the actuator situated downstream) in order to make it pass externally to this sleeve and thus make it possible to contain and reduce the size thereof, while leaving space for integrating the reduction gear 10.

The aim of the present invention is to afford a solution to this problem.

To this end, it relates to a reduction gear having an epicyclic-train, comprising a planetary input shaft of longitudinal axis, planets meshing around said shaft and supported by a planet carrier, and two transverse sides, the reduction gear being remarkable by the fact that it comprises at least one fluid-transfer pipe able to be connected to a fluid-supply source and passing through the planet carrier, while being constrained to rotate therewith, from a first of said transverse sides of the reduction gear as far as a second of said transverse sides thereof in order to emerge outside the reduction gear and distribute the fluid, and in which the pipe is provided, on said second of said transverse sides, with an annular cavity containing the fluid to be distributed at the exit from the planet carrier.

Preferably, said first of said transverse sides of the reduction gear is an upstream side, and said second of said transverse sides of the reduction gear is a downstream side.

Thus, by virtue of the invention, it is possible to transfer fluid directly through the planet carrier of the reduction gear, from a supply source that is situated on the upstream transverse side of the reduction gear, to make it pass longitudinally through the planet carrier turning in one direction, and then to bring it outside the latter, on the downstream transverse side, in order to directly lubricate for example a member, a mechanism or the like.

In the preferential application of the reduction gear, the fluid circulating in the pipe lubricates a bearing or the like arranged on a transverse side (preferably downstream) of the planet carrier, external to the latter.

In this application, the epicyclic reduction gear is differential in order to drive at its output two shafts rotating at different speeds. Around the planets an external ring gear meshes, to which an output shaft carrying the bearing to be lubricated by the fluid emerging from the pipe is able to be connected.

Thus it is possible to transfer lubricant from in particular the source supplying cooling oil to the reduction gear, and to guide the lubricant between two reference frames having different rotational speeds rather than by the sleeve according to the prior solution, which makes it possible to limit the overall size of the sleeve and thus to improve integration of the reduction gear.

According to a preferred embodiment, the fluid pipe passes axially through one of the hollow shafts of the planet carrier, the planets being respectively mounted around hollow shafts.

For optimum lubrication, a plurality of hollow shafts of the planet carrier have a fluid pipe passing through each of them.

According to another feature, a ring having lateral fingers is connected on a transverse side (preferably upstream) to the planet carrier in order to support the fluid cavity. Advantageously, the lateral fingers of the ring pass through the hollow shafts of the planet carrier around which the planets are mounted, in order to emerge on a transverse side (preferably downstream) of the planet carrier and to support the fluid cavity. The pipes may be connected to the respective lateral fingers in order to hold them and guide them.

Moreover, in a preferred embodiment, the fluid cavity is formed by an annulus connected to the free ends of the lateral fingers of the ring and has an axially open compartment to which the fluid pipes are connected on one side, and which is able on the other side to come in contact, sealingly, with a support face of the shaft carrying the bearing to be lubricated.

Advantageously, the free ends of the lateral fingers of the ring are joined by a support annulus against which the annulus forming the fluid cavity is mounted, and between the two assembled annuluses a seal is provided which is intended to absorb the functional clearances and to axially press the compartment of the annulus forming the cavity against the support face. The invention also relates to a turbine engine in particular for an aircraft, of the type comprising a gas generator part and a propulsion part having a pair of coaxial contra-rotating propellers driven by means of a differential epicyclic reduction gear connected to a turbine of the gas generator part.

Advantageously, the differential epicyclic reduction gear is as defined previously.

In this application, the epicyclic reduction gear is preferentially differential in order to drive at its output two oppositely rotating shafts, the shaft of the planet carrier to which the shaft of the downstream propeller is connected and the shaft of the ring gear to which the shaft of the upstream propeller is connected. The planet carrier turns in the opposite direction to the planetary shaft. The external ring gear turning in the opposite direction to the planet carrier meshes around the planets. Thus it is possible to transfer lubricant from in particular the source supplying cooling oil to the reduction gear, and to guide the lubricant between two reference frames having opposite rotational directions.

The figures of the accompanying drawings will give a clear understanding of how the invention can be implemented.

Figure 1:
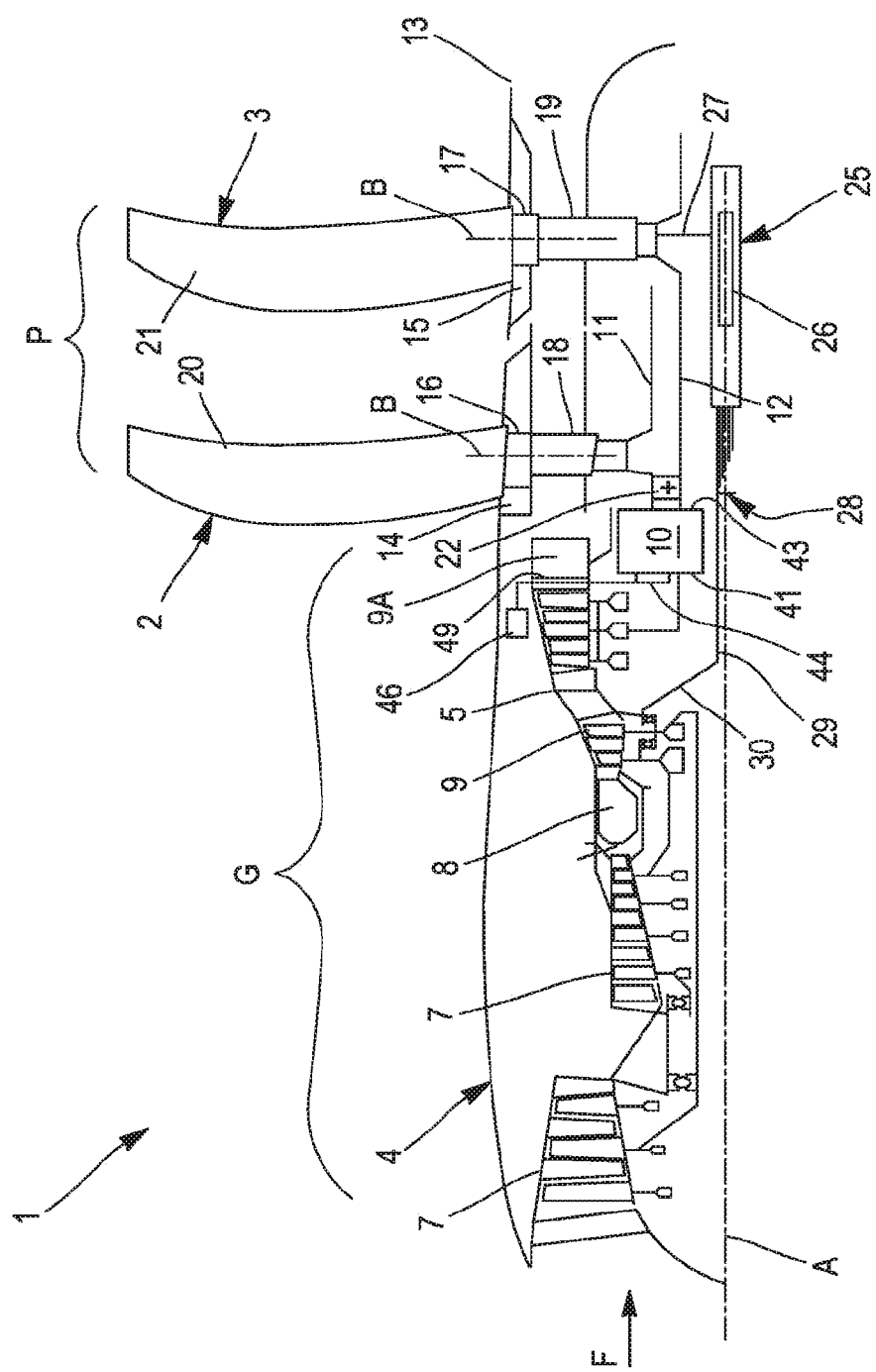
FIG. 1 is a schematic view in axial section of a turboshaft engine having a pair of contra-rotating propellers downstream of the gas generator, and incorporating an epicyclic reduction gear for the contra-rotating driving of the shafts of the propellers, and the inter-shaft bearing to be lubricated.
Figure 2:
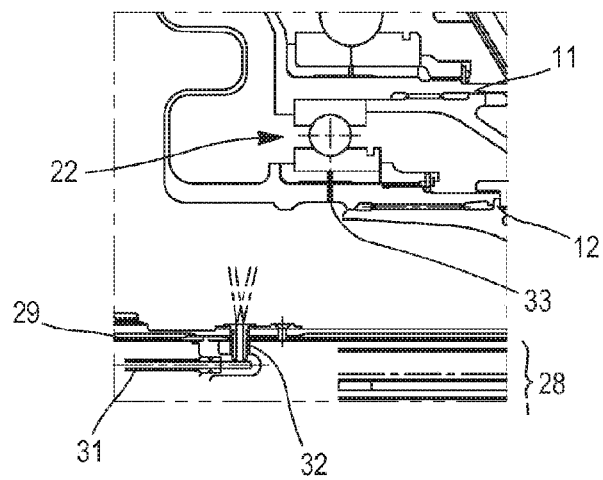
FIG. 2 is a view in partial axial section of the inter-shaft bearing of the contra-rotating propellers with the solution of the prior art consisting of lubricating the bearing from a normal supply line in a sleeve internal to the shafts.
Figure 3:
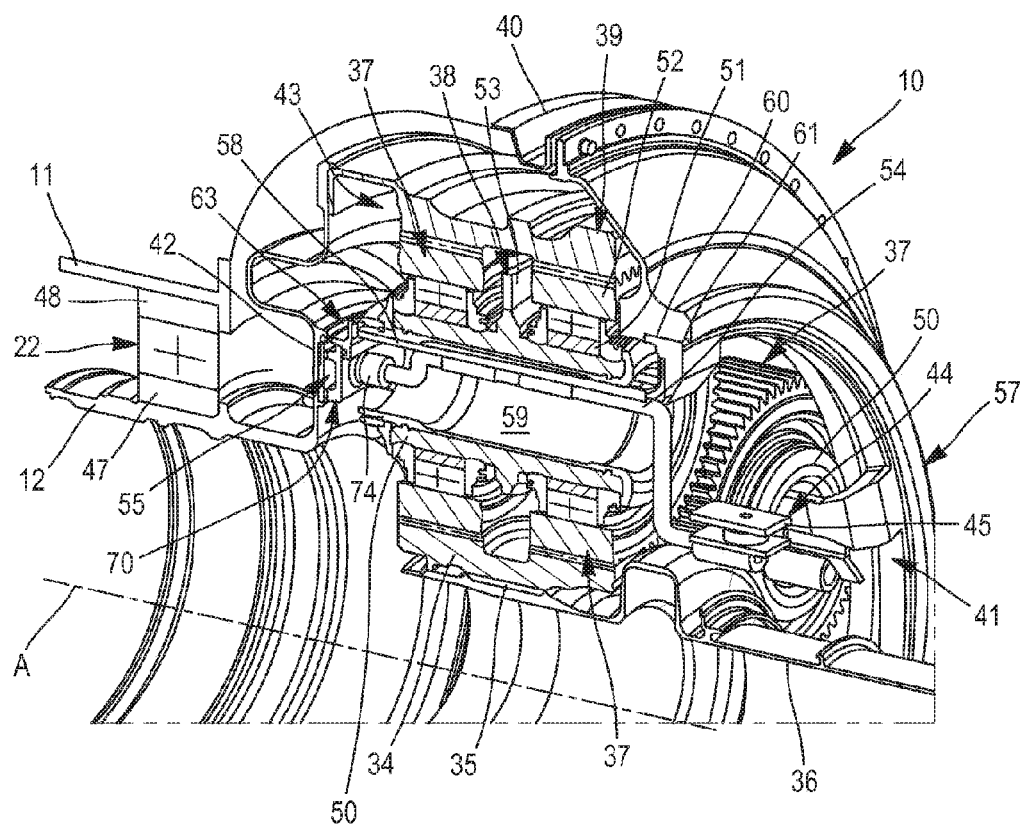
FIG. 3 is a cut-away perspective view of the epicyclic reduction gear having the pipes for lubricating the inter-shaft bearing in accordance with the solution of the invention.

Referring to FIGS. 1 and 3, to allow the opposite rotations of the two upstream 2 and downstream 3 propellers, the reduction gear 10 is differential, having a reversed epicyclic gear train. To this end, it comprises, with respect to the longitudinal axis A, a planetary input shaft in the form of a toothed wheel 34 that is, in this example, mounted by a splined connection 35 on the turbine shaft 36 turning in a rotational direction while driving the reduction gear. Planets 37 mesh around the input shaft 34 and are supported by a planet carrier 38 turning accordingly in the reverse direction of rotation to the input shaft, and an external ring gear 39 meshing with the planets and turning accordingly in the same direction of rotation as the input shaft 34 and in the opposite direction to the planet carrier 38.

In the application to the turboshaft engine 1 having a pair of propellers, the external shaft 11 driving the upstream propeller 2 is constrained to rotate with the planet carrier 38 by means of an annular bulb 40 that consists of assembled parts (FIG. 3) surrounding the reduction gear 10 and which is connected, on the upstream transverse side 41 of the reduction gear with respect to the flow F, along the axis A, to the planet carrier 38. As for the internal shaft 12 driving the downstream propeller 3, this terminates in an external transverse face 42 which is normal to the axis A of the turboshaft engine, and which is constrained to rotate with the external ring gear 39 on the downstream transverse side 43 of the reduction gear.

Moreover, at the entry on the upstream transverse side (or face) 41 of the reduction gear, there is an oil-transfer bearing 44 for lubricating the reduction gear. This bearing is partially shown and schematically comprises two annular parts. One, internal, 45 is partially shown in FIG. 3 and is secured to the planet carrier and the other, external, not shown, is secured to a casing. Between these parts a fluid for lubricating the reduction gear arrives, issuing from an upstream supply source 46 (FIG. 1) situated in the structural casing 5, and passing through one of the radial arms 49. The oil-transfer bearing 44, the planet carrier 38, the annular bulb 40 and therefore the external shaft 11 of the upstream propeller 2 are connected so as to rotate relative to one other and consequently turn in the same direction and at the same speed. At the exit on the downstream transverse side (or face) 43 of the reduction gear, there is the inter-shaft bearing (roller bearing) 22 to be lubricated, the inner ring 47 of which is connected to the internal shaft 12 of the downstream propeller, and the outer ring 48 of which is connected to the external shaft 11 of the upstream propeller, via its bulb.

Advantageously, to lubricate this inter-shaft bearing 22 while thus reducing the fluid lines passing through the sleeve 29 and releasing space for the reduction gear, the invention consists of directly transferring some of the lubricant passing through the transfer bearing 44 and turning in a rotational direction, to the inter-shaft bearing 22 while passing, longitudinally along the axis A, right through the planet carrier 38 turning in the direction corresponding to that of the transfer bearing 44, as far as the transverse face 42 of the shaft 12 secured to the ring gear 39 turning in the other direction, in order to directly inject the lubricant in the direction of the inter-shaft bearing 22, the inner and outer rings of which are respectively connected to the ring gear and the planet carrier.

Before coming to the embodiment illustrating the invention, the reduction gear 10 will be described more precisely below. In the usual fashion in this type of differential reduction gear 10 and as shown by FIG. 3, the planets 37 are evenly distributed around the input turbine shaft 36 and their teeth cooperate with the teeth on the intermediate toothed wheel 34 constrained to rotate with the input shaft 36. In a variant, the toothed wheel could form an integral part of said shaft.

The planet carrier 38 comprises, FIG. 3, hollow shafts 50 which are parallel to the axis A and evenly distributed angularly, and on which the planets 37 are respectively mounted. The hollow shafts are connected together by a connecting collar 53 of the planet carrier. In particular, each planet 37 corresponds in this example to two identical bearings (roller bearings) mounted, so as to be aligned and spaced apart from each other by the collar 53, on the hollow shaft 50. The inner rings 51 of the bearings are immobilised on each hollow shaft of the planet carrier, while the outer rings 52 carrying the teeth at the periphery cooperate with internal teeth on the external ring gear 39, driving this in reverse rotation. The annular bulb or flange 40 terminating the corresponding end of the shaft 11 of the upstream propeller and surrounding the reduction gear is secured to the planet carrier 38 by the upstream transverse side 41.

Figure 4:
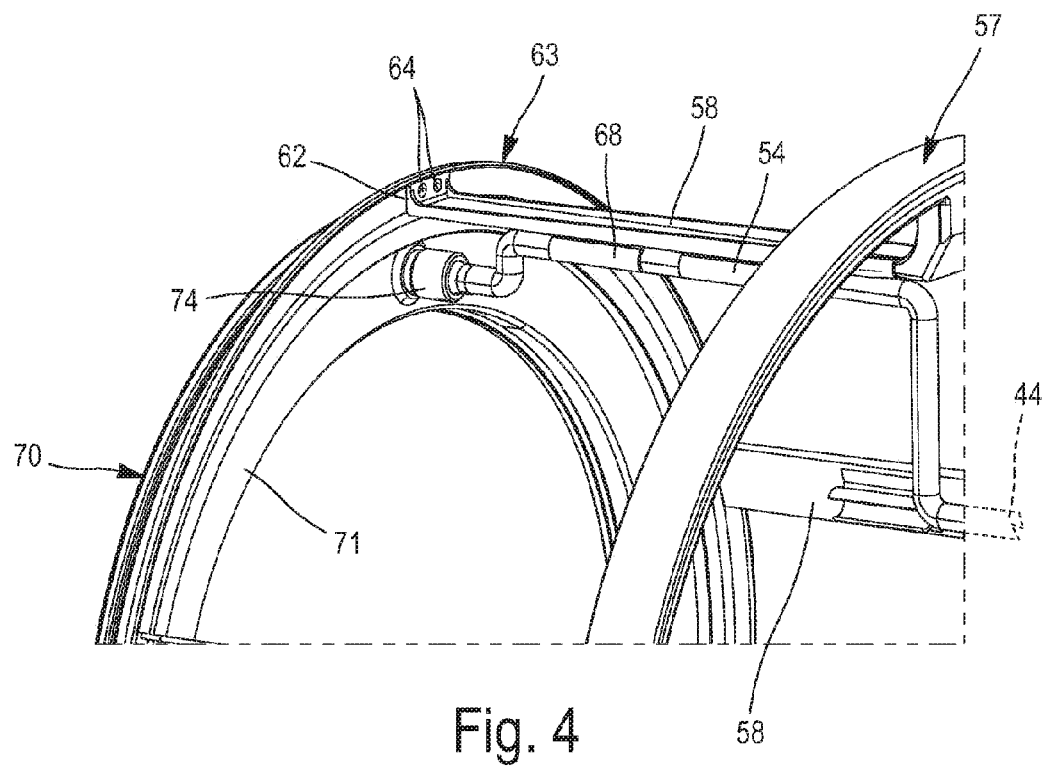
FIGS. 4 and 5 show, in enlarged perspective, respectively from upstream and downstream, one of the pipes conveying the lubricant, the ring having lateral fingers and the lubricant cavity in the direction of the bearing to be lubricated.
Figure 5:
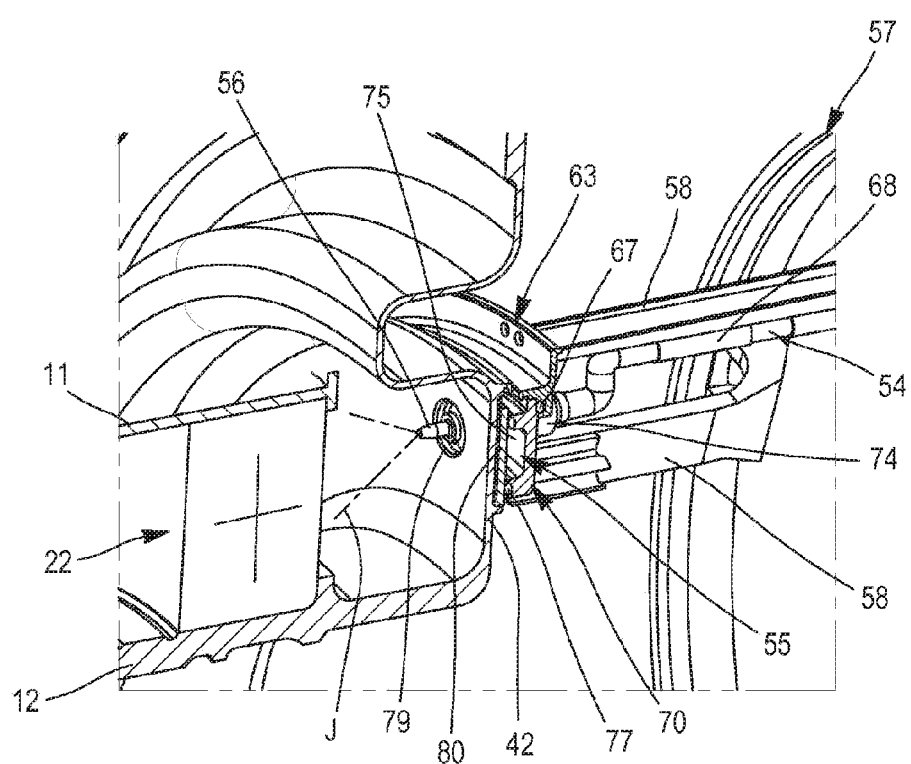

The transfer of lubrication comprises, in this example shown in particular in FIGS. 3, 4 and 5, a means having a plurality of pipes 54 leading to a cavity 55 for collecting the lubricant, nozzles 56 (FIGS. 5 and 8) communicating with the cavity and ejecting the lubricant towards the bearing 22, and a ring 57 having lateral fingers 58 passing axially through the reduction gear.

Pipe means any elongate object such as a conduit, a manifold, a tube, etc., making it possible, considering the mechanically and thermally high operating conditions, to circulate a fluid in complete safety.

The pipes 54 are connected, on the upstream transverse side 41 of the reduction gear, to the oil-transfer bearing 44 in order to receive therein some of the oil circulating in the latter, and they pass through the planet carrier 38, with which they turn in the same direction, passing through the internal passages 59 of the hollow shafts 50, substantially parallel thereto. The pipes 54 emerge, on the other downstream transverse side 43 of the reduction gear, in order to be connected to the cavity 55, as will be seen below. Furthermore, the pipes 54 are guided along fingers 58 while being connected thereto by clips or other holding means 68.

First, as shown by FIGS. 3 to 6, the ring 57 is mounted on the upstream transverse side 41 of the reduction gear in order to be fixed in an internal annular shoulder 60 terminating the bulb of the shaft of the upstream propeller by means of a circlip 61 or the like and a connection of the tongue-and-groove type in order to angularly lock the ring to the bulb in the required position. The connection is not shown in the drawings. The lateral fingers 58 of the ring, which are disposed parallel to the longitudinal axis A, are, in this example, identical in number to the hollow shafts 50 of the planet carrier, shafts that the fingers pass through respectively in order to emerge on the other transverse side 43.

The purpose of the free ends 62 of the fingers of the ring 57 is to carry the cavity 55, which is caused to be in contact with the transverse face 42 of the internal shaft 12 of the downstream propeller. It would therefore be understood that the ring 57 makes it possible to change from a rotational reference frame turning in one direction at the same speed (the one containing the oil-transfer bearing 44, the planet carrier 38, the bulb 40 of the external shaft 11 of the upstream propeller, and the ring 57 together with the associated cavity 55 and the pipes 54 connected to this ring) to another reference frame turning in the opposite direction (the one containing the external ring gear 39 of the reduction gear and the internal shaft 12 of the downstream propeller).

Figure 6:
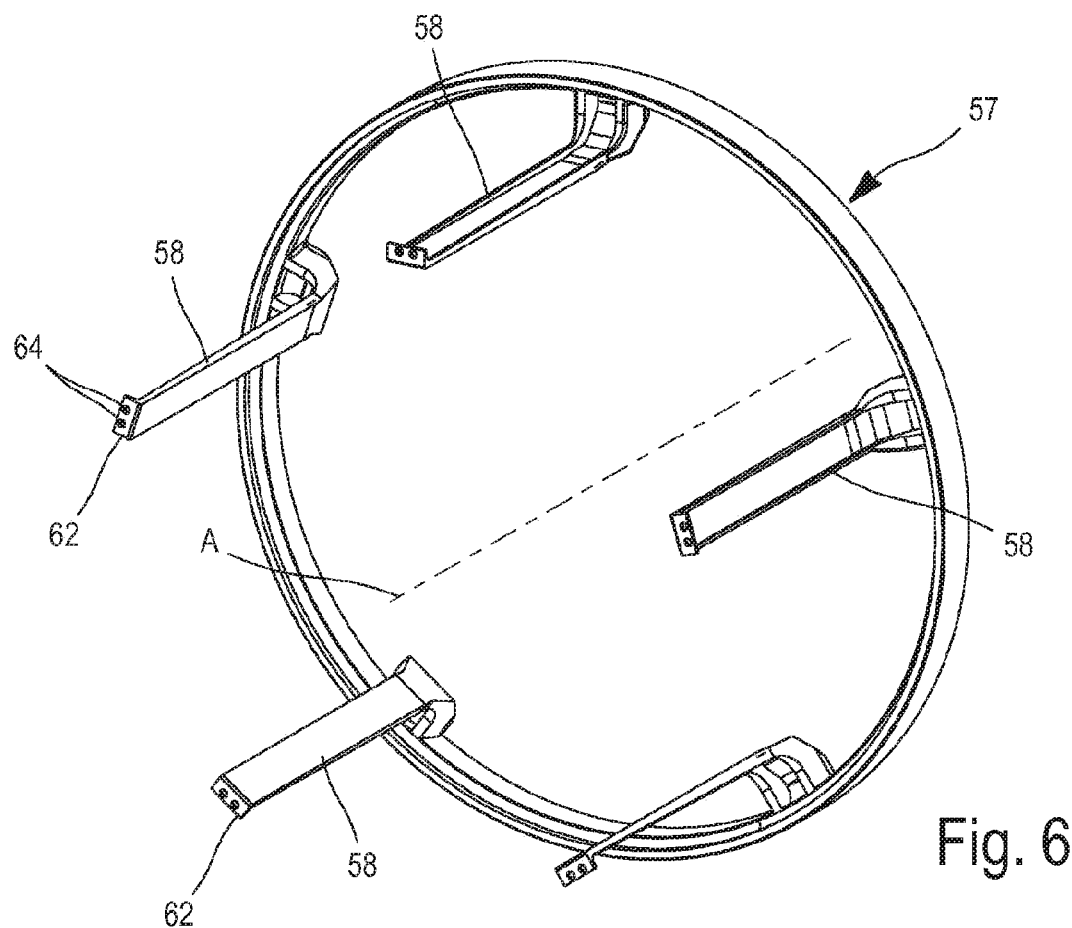
FIG. 6 shows, in perspective, the ring having lateral fingers.

In addition, a common support annulus 63 is fixed to all of the free ends 62 of the fingers 58 by fixing elements 64 (screws or the like) passing respectively through holes provided in end lugs of the fingers, as shown by FIGS. 4 to 6. The support annulus 63 has moreover, FIG. 7, an annular groove 65 provided in a transverse face 66 of the annulus, turned towards the outside of the ring having lateral fingers (and therefore of the reduction gear) and which receives a seal 67, the role of which will be specified subsequently.

Figure 7:
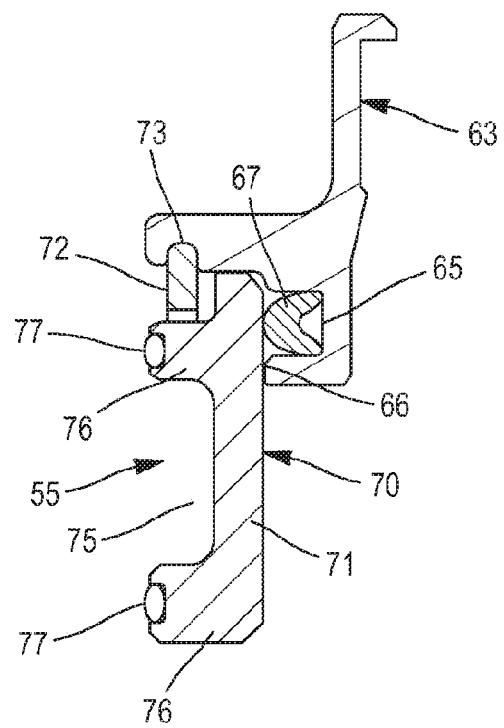
FIG. 7 is a radial section through the annuluses assembled in contact with the track provided on the shaft of the downstream propeller.

An annulus 70 which is intended to form the cavity 55 for transferring oil via the pipes 54, in the direction of the inter-shaft bearing, is fixedly attached to this support annulus 63. In particular, as shown by FIGS. 5 and 7, this annulus 70 forming the cavity 55 has a U-shaped cross section, the base 71 of which is attached against the transverse face 66 of the support annulus 63 while axially compressing the seal 67. The annulus 70 forming the cavity is held, with respect to the support annulus, axially by a circlip or the like 72 housed in an internal peripheral groove 73 on the annulus 63, FIG. 7, and angularly by a tongue-and-groove connection known per se and not shown.

The pipes 54 for conveying the lubricant are connected, by suitable couplings 74, in the base 71 of the annulus 70 forming the cavity, as shown in particular by FIGS. 3, 4 and 5.

The cavity 55 for the lubricant conveyed by these pipes 54, which may be made from rigid or semi-rigid metal, is defined by the internal annular compartment 75 of the U with the transverse face 42 of the internal shaft 12. It can be seen, in FIGS. 5 and 7, that the ends of the flanges 76 of the U come into contact, moreover with sealing by means of annular seals 77 housed at the end of the flanges of the annulus 70 having a cavity, with a track 80 in the form of a washer held securely, on the transverse face 42 of the internal shaft and serving as an abutment for the flanges of the annulus while compressing the annular seals. The lubricant is therefore contained sealingly in the compartment 75 by the seals 77, without leakage to the outside, while passing between two opposite rotary reference frames.

Figure 8:
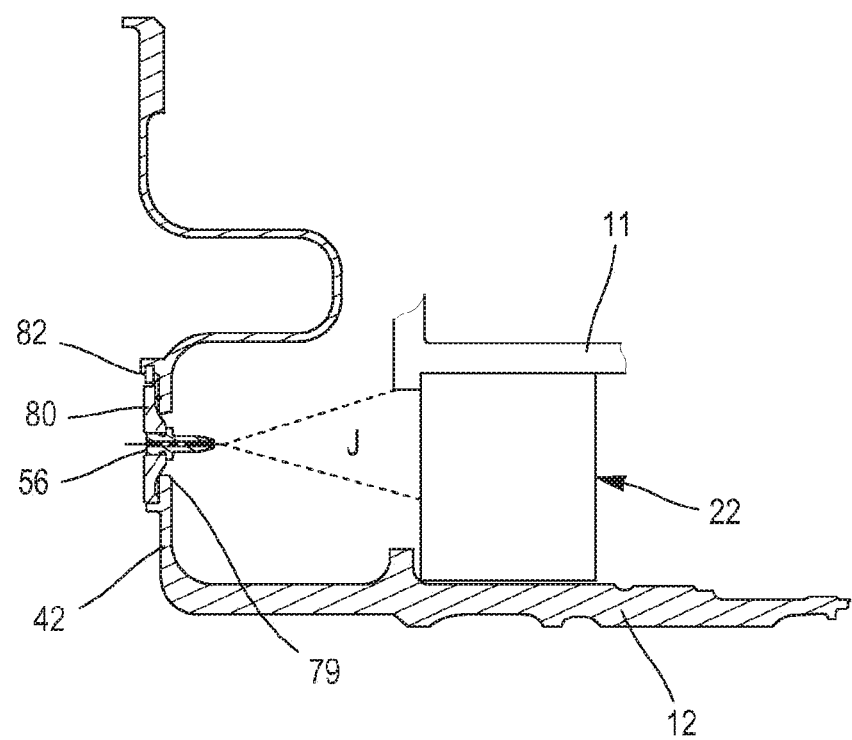
FIG. 8 is a cross section through the shaft of the downstream propeller having a nozzle mounted on the cavity-reception track, and fixed to the shaft to lubricate the inter-shaft bearing.

The track 80 is in particular illustrated with regard to FIG. 8, where it can be seen that it is mounted in a compartment 81 provided in the transverse face 42 of the internal shaft 12 while being held therein by a circlip 82 and by an angular groove-and-tongue connection, not shown. The nozzles 56 that pass through the holes 79 provided in the transverse face 42 are received in this track 80 by screwing or any other suitable fixing means. FIGS. 5 and 8 schematically show the jet J of the nozzles 56 at the rear outlet of the transverse face 42 in order to continuously lubricate the inter-shaft bearing 22 that is situated facing between the shafts 11 and 12 of the propellers.

In order to provide the mechanical and thermal strength of the seals 77, the latter are preferably made from carbon and the track 80 is metal.

Moreover, in order to guarantee the positioning and therefore the contact between the annulus 70 and the track 80 of the shaft delimiting the cavity 55 therebetween, as well as in order to take account of the functional clearances, in particular axial, use is advantageously made of the seal 67 provided between the two assembled annuluses 63 and 70. This is because the axial position of the annulus 70 having a cavity 55 for the transfer of oil closest to the holding circlip corresponds to the maximum clearance opening in the bearing 22, namely the maximum retraction of the downstream propeller shaft 12 with respect to the reduction gear 10 and therefore to the upstream propeller shaft 11 since the reduction gear is rigidly mounted on this shaft and it is necessary also to take into account the functional clearances for determining the opening. In the event of variation (reduction) in the separation between the two annuluses 63, 70, the seal 67, preferably with an omega-shaped cross section to provide sufficient elasticity, is compressed, thus absorbing the variation in clearance. Even in the case of maximum separation of the two walls of the annuluses, the seal 67 is always compressed and accordingly presses the carbon seals 77 of the oil-transfer annulus against the carbon track mounted on the downstream propeller shaft.

The embodiment described above, by causing the lubricating fluid to pass through the epicyclic reduction gear, affords a solution to the problem of the passage of the fluid lines in an already very crowded environment.

Although the invention is described here in relation to a differential epicyclic reduction gear, with shafts rotating in opposite directions, it goes without saying that it could be adapted to a direct epicyclic reduction gear.

The invention claimed is:

1. Reduction gear having an epicyclic train comprising a planetary input shaft, planets meshing around said shaft and supported by a planet carrier, and two transverse sides comprising at least one fluid-transfer pipe able to be connected to a fluid-supply source and passing through the planet carrier, while being constrained to rotate therewith, from a first of said transverse sides of the reduction gear as far as a second of said transverse sides thereof in order to emerge outside the reduction gear and distribute the fluid, and in which the pipe is provided, on said second of said transverse sides, with an annular cavity containing the fluid to be distributed at the exit from the planet carrier.

2. Reduction gear according to claim 1, wherein the pipe lubricates a bearing arranged on a transverse side of the planet carrier, external to the latter.

3. Reduction gear according to claim 2, wherein around the planets an external ring gear meshes, to which an output shaft carrying the bearing to be lubricated by the fluid emerging from the pipe is able to be connected.

4. Reduction gear according to claim 1, wherein the fluid pipe passes axially through one of a plurality of hollow shafts of the planet carrier, the planets being respectively mounted around the hollow shafts.

5. Reduction gear according to claim 1, wherein a ring having lateral fingers is connected on a transverse side to the planet carrier and supports the fluid cavity.

6. Reduction gear according to claim 5, wherein a plurality of hollow shafts of the planet carrier have a fluid pipe passing through each of them.

7. Reduction gear according to claim 6, wherein the lateral fingers of the ring pass through the hollow shafts of the planet carrier, so as to emerge on a transverse side of the planet carrier in order to support the fluid cavity.

8. Reduction gear according to claim 7, wherein the fluid cavity is formed by an annulus connected to the free ends of the lateral fingers of the ring and has an axially open compartment to which the fluid pipes are connected on one side, and which is able on the other side to come into sealing contact with a support face of the shaft carrying the bearing to be lubricated.

9. Reduction gear according to claim 8, wherein the free ends of the lateral fingers of the ring are joined by a support annulus against which the annulus forming the fluid cavity is mounted, and between the two assembled annuluses a seal is provided which is configured to absorb the functional clearances and to axially press the compartment of the annulus forming the cavity against the support face.

10. Reduction gear according to claim 1, wherein said first of said transverse sides of the reduction gear is an upstream side, and said second of said transverse sides of the reduction gear is a downstream side.

11. Turbine engine for an aircraft comprising: a gas generator part and a propulsion part having a pair of coaxial contra-rotating propellers driven by a differential epicyclic reduction gear of claim 1 that is connected to a turbine of the gas generator part.

* * * * *